(No Model.)
F. H. DONATH.
DOOR MAT.
No. 583,463. Patented June 1, 1897.
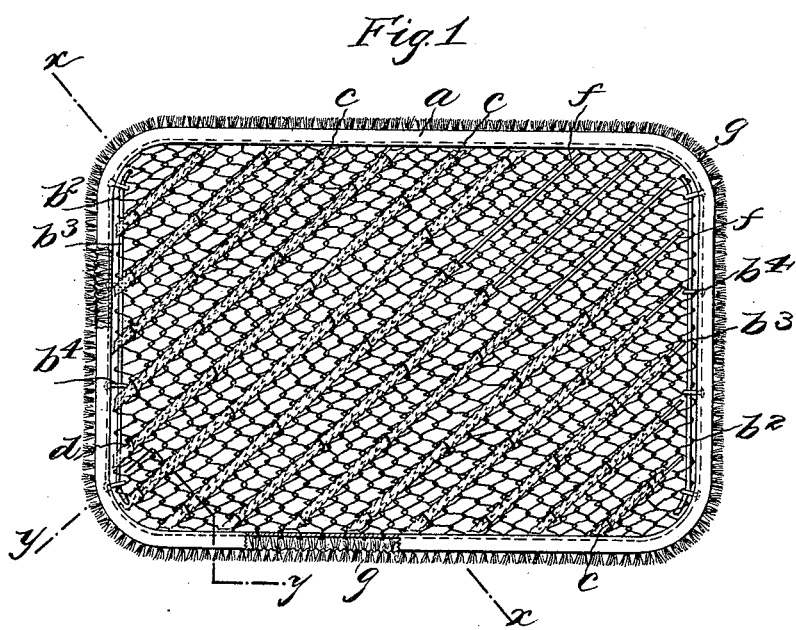
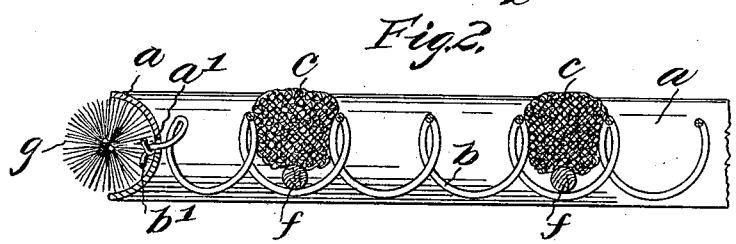
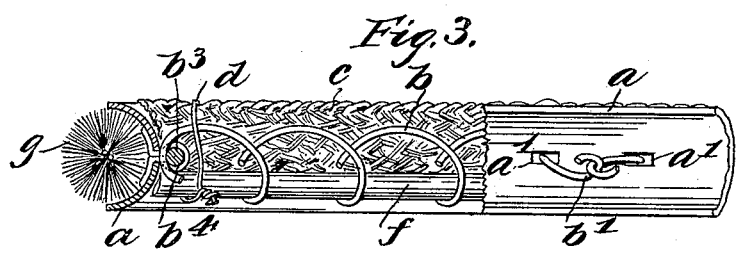
Witnesses:
Inventor,
Franz Hermann Donath
By Henry Orth
Atty.

UNITED STATES PATENT OFFICE.

FRANZ HERMANN DONATH, OF VIENNA, AUSTRIA-HUNGARY.

DOOR-MAT.

SPECIFICATION forming part of Letters Patent No. 583,463, dated June 1, 1897.

Application filed March 20, 1896. Serial No. 584,140. (No model.) Patented in Austria November 22, 1894, No. 44/6,041; in France December 11, 1894, No. 243,575; in Belgium January 7, 1895, No. 113,532; in England January 8, 1895, No. 519, and in Hungary March 21, 1895, No. 2,437.

*To all whom it may concern:*

Be it known that I, FRANZ HERMANN DONATH, a subject of the Emperor of Austria-Hungary, residing at Vienna, in the Province of Lower Austria, in the Empire of Austria-Hungary, have invented certain new and useful Improvements in Door-Mats, (for which I have obtained Letters Patent in Austria, November 22, 1894, No. 44/6,041; in Hungary, March 21, 1895, No. 2,437; in Belgium, January 7, 1895, No. 113,532; in England, January 8, 1895, No. 519, and in France, December 11, 1894, No. 243,575;) and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The door-mats or scrapers hitherto in use do not answer satisfactorily their purpose, since those made of straw, coir, or reeds after being in use a short time become smeared on their surface, particularly in rainy or snowy weather, and therefore cease to imbibe the moisture, whereas the door-mats or scrapers made of iron, wood, or rubber, if they scrape off the greatest part of the mud from the shoes, do not absorb any of the moisture on them. These defects are entirely obviated by the improvement to which the present invention relates. According to the invention the door-mat or scraper, made of wirework or of wood or iron bars, comprises a filling of material which will easily imbibe moisture—such as fibers of bast, jute, hemp, coir, hair, wool, or the like—the door-mat then having the double effect of scraping off the mud from the shoes and of absorbing the moisture from them.

In the accompanying drawings, which illustrate a door-mat or scraper constructed according to the present invention, Figure 1 is a plan of the said door-mat or scraper. Fig. 2 is a section on the line $x$ $x$ of Fig. 1, and Fig. 3 is a section on the line $y$ $y$ of Fig. 1 and partly a side view.

As shown, the improved door-mat or scraper is composed of a frame $a$, having wirework $b$ stretched over the said frame. This wirework is provided at suitable places with a filling $c$, of fibrous material, either threaded through the meshes or sunk in recesses provided in the wirework and prevented from falling out by means of wire $d$, as shown in Figs. 1 and 3.

The frame $a$ is made preferably of sheet-iron of semicircular cross-section and is provided at suitable intervals with perforations $a'$, through which the free ends $b'$ of the wires forming the network are projecting outward where each two adjacent ends of these wire ends are connected together. In the perpendicular part of the wirework, (see on the right and left sides of Fig. 1,) which terminates by meshes $b^2$ and not by free wire ends, these meshes $b^2$ are connected to the frame in such a way that a piece of wire is passed through two adjacent meshes and the free ends are passed outward through two contiguous perforations $a'$ of the outer frame, where they are connected together by twisting. This connection can also be effected in the manner shown in Fig. 1 of the drawings by passing through all the meshes $b^2$ on each side of the frame a rod or thick wire $b^3$ and by rigidly fastening this rod $b^3$ to the frame $b$ by wire staples $b^4$, passed through the apertures $a'$ and bent over them so as to firmly hold them in place.

For giving the door-mat a greater elasticity the fibrous filling is not placed direct upon the wirework, but on the bottom of the grooves in the wirework intended for reception of the fibrous filling $c$ are placed elastic rods $f$, made of cane or other suitable material, and upon these rods $f$ is arranged the fibrous filling $c$ in the manner described above.

In the outer groove-shaped periphery of the frame $a$ a filling of fibrous material is also arranged which may have the shape of a rope or of a cylindrical brush $g$, as shown in the drawings.

Instead of fibers any other moisture-absorbing material may be used—for instance, hair, bristles, wool, or the like—and the wirework may be replaced by a wood or iron grate or by a sheet of rubber suitably perforated. It will be easily understood that the scraper proper—that is to say, the wirework or the substitute for it—scrapes off the dirt from the shoes, while the filling absorbs the moisture.

I claim—

1. A door-mat composed of rows of more or less elastic or resilient non-absorbent scrapers projecting from the foundation of the mat, and intervening rows of absorbent wipers projecting likewise from the foundation of the mat, for the purpose set forth.

2. A door-mat composed of rows of more or less elastic or resilient metallic scrapers projecting from the foundation of the mat, and intervening rows of absorbent wipers supported above the foundation of said mat.

3. A door-mat composed of a frame, a brush secured to and surrounding said frame, rows of more or less elastic or resilient metallic scrapers secured to said frame, and intervening rows of absorbent wipers secured to said scrapers, for the purpose set forth.

4. A door-mat composed of a frame having a circumferential seat in its outer face, a wire fabric secured within the frame to form rows of meshes, an absorbent material interposed between some of said rows of meshes, and a like material or brush secured in the aforesaid circumferential seat, substantially as and for the purpose set forth.

5. A door-mat comprising a fabric of interlaced coils of wire to form unbroken rows of more or less elastic or resilient scrapers, an absorbent material threaded through or interposed between some of the rows of scrapers and a frame to which said fabric is secured, for the purpose set forth.

6. A door-mat comprising a fabric of interlaced coils of wire to form unbroken rows of more or less elastic or resilient scrapers, an absorbent material threaded through or interposed between some of the rows of scrapers, a more or less elastic rod extending through the coils below the absorbent material and a frame to which such parts are secured, for the purpose set forth.

7. A door-mat comprising a fabric of coils of wire to form unbroken rows of more or less elastic or resilient scrapers, and an absorbent material intervening between some of the rows of scrapers, and a concavo-convex sheet-metal frame to which the fabric is secured, for the purpose set forth.

In testimony whereof I affix my signature in presence of two witnesses.

FRANZ HERMANN DONATH.

Witnesses:
HARRY BELMONT,
JOSEF ZEH ARNE.